United States Patent
Yamamoto

(10) Patent No.: US 8,452,783 B2
(45) Date of Patent: May 28, 2013

(54) DOCUMENT PROCESSING DEVICE AND PROGRAM

(75) Inventor: Koji Yamamoto, Tokyo (JP)

(73) Assignee: Access Co., Ltd., Tokyo (JP)

( * ) Notice: Subject to any disclaimer, the term of this patent is extended or adjusted under 35 U.S.C. 154(b) by 276 days.

(21) Appl. No.: 12/443,459

(22) PCT Filed: Sep. 27, 2007

(86) PCT No.: PCT/JP2007/001050
§ 371 (c)(1), (2), (4) Date: Mar. 27, 2009

(87) PCT Pub. No.: WO2008/041357
PCT Pub. Date: Apr. 10, 2008

(65) Prior Publication Data
US 2010/0017406 A1    Jan. 21, 2010

(30) Foreign Application Priority Data
Sep. 29, 2006 (JP) ................................ 2006-268795

(51) Int. Cl.
G06F 17/30    (2006.01)
G06F 3/048    (2006.01)

(52) U.S. Cl.
USPC ........................................ 707/754; 715/764

(58) Field of Classification Search
USPC ............... 707/694, 754, 755, 756; 715/764, 715/769, 770, 810
See application file for complete search history.

(56) References Cited

U.S. PATENT DOCUMENTS

| | | | |
|---|---|---|---|
| 5,375,200 A * | 12/1994 | Dugan et al. | 715/804 |
| 5,796,397 A | 8/1998 | Kusano | |
| 5,897,650 A * | 4/1999 | Nakajima et al. | 715/202 |
| 6,247,042 B1 * | 6/2001 | Engstrom et al. | 718/107 |
| 6,401,138 B1 * | 6/2002 | Judge et al. | 719/328 |
| 7,346,852 B2 * | 3/2008 | Yamasaki | 715/769 |
| 7,512,952 B1 * | 3/2009 | Liu et al. | 718/108 |

(Continued)

FOREIGN PATENT DOCUMENTS

| | | |
|---|---|---|
| EP | 1591894 A2 | 11/2005 |
| JP | 6-131199 A | 5/1994 |

(Continued)

OTHER PUBLICATIONS

International Search Report mailed Jan. 8, 2008, for PCT Application No. PCT/JP2007/001050 filed Sep. 27, 2007, 2 pages.

(Continued)

*Primary Examiner* — Jorge A Casanova
(74) *Attorney, Agent, or Firm* — Morrison & Foerster LLP

(57) ABSTRACT

A switching information acquiring unit 110 acquires information of switching from a screen displayed by a first application program to a screen displayed by a second application program. A character string extracting unit 104 detects character strings from a document file displayed on a screen by the first application program by using a filter serving as a rule to detect a character string matched with a predetermined condition supposed to be used in a second application program and matched with a predetermined condition from a document file. A display control unit 106 presents a character string actually used in the second application from the character strings detected by a character string extracting unit in response to detection of the switching by a switching detecting unit in a display mode in which a user can select the character string.

20 Claims, 9 Drawing Sheets

U.S. PATENT DOCUMENTS

| | | | |
|---|---|---|---|
| 2002/0081997 A1* | 6/2002 | Morishima | 455/412 |
| 2005/0050031 A1* | 3/2005 | Matsumoto | 707/3 |
| 2005/0210401 A1* | 9/2005 | Ketola et al. | 715/770 |
| 2005/0223395 A1* | 10/2005 | Maeta et al. | 719/331 |
| 2006/0190835 A1* | 8/2006 | Cunningham et al. | 715/770 |
| 2008/0104523 A1* | 5/2008 | Umeki et al. | 715/751 |
| 2008/0201656 A1* | 8/2008 | Kim et al. | 715/770 |
| 2012/0019682 A1* | 1/2012 | Nobels | 348/211.1 |

FOREIGN PATENT DOCUMENTS

| | | |
|---|---|---|
| JP | 8-137804 A | 5/1996 |
| JP | 2000-330681 A | 11/2000 |
| JP | 2003-122771 A | 4/2003 |
| JP | 2005-285009 A | 10/2005 |

OTHER PUBLICATIONS

International Preliminary Report on Patentability mailed Apr. 9, 2009, for PCT Application No. PCT/JP2007/001050 filed Sep. 27, 2007, 11 pages.

Office Action received for Chinese Patent Application No. 200780036334.2, issued on Dec. 14, 2011, 18 pages (12 pages of English translation and 6 pages of Office Action).

Office Action received for Chinese Patent Application No. 200780036334.2, issued on Oct. 8, 2012, 20 pages (14 pages of English Translation and 6 pages of Office Action).

Office Action received for Japanese Patent Application No. 2008-537403, mailed on Sep. 21, 2012, 5 pages (3 pages of English translation and 2 pages Of Office Action).

* cited by examiner

FIG.9A

```
                                    ┌─250
DOCUMENT FILE
<html>
<head>
<title>XXXX HomePage</title>
</head>
<body>
Welcome to XXXX Homepage!
  <p>
    <object date="rtsp://www.XXXX.co.jp/test.svg" ⎫─252
type="audio/x-pn-realaudio-plugin" width="200" height="200">
you can't see the movie by your browser.
  </object>
</p>
<table border=1>
  <tr>
    <td><a href="http://www.XXXX.co.jp/test1.mp3"> XXXX  ⎫
Report1</a></td>                                          ⎬254
  </tr>                                                   ⎭
  <tr>
    <td><a href="http://www.XXXX.co.jp/test2.mp3"> XXXX  ⎫
Report2</a></td>                                          ⎬256
  </tr>                                                   ⎭
  <tr>
    <td><a href="http://www.XXXX.co.jp/test3.wav"> XXXX  ⎫
Report3</a></td>                                          ⎬258
  </tr>                                                   ⎭
</table>
</body>
</html>
```

FIG.9B

```
          ┌─260
┌─────────────────────┐
│   XXXX HomePage     │
├─────────────────────┤
│Welcome to XXXX Homepage! │
│ ┌───────┐           │
│ │ AUDIO │ ─262      │
│ └───────┘           │
│you can't see the movie by your│
│browser              │
│ ┌─────────────────┐ │
│ │ XXXX Report 1   │─264
│ ├─────────────────┤ │
│ │ XXXX Report 2   │─266
│ ├─────────────────┤ │
│ │ XXXX Report 3   │─268
│ └─────────────────┘ │
└─────────────────────┘
```

FIG.10

```
                      ┌─270
FILTER
<?xml version="1.0" encoding="shift_jis"?>
<filter>
 <application>MediaPlayer</application>
 <rule>                          ⎫
  <element>                      │
   <name>object</name>           │
   <type>scheme</type>           ⎬272
   <value>rtsp://</value>        │
  </element>                     │
 </rule>                         ⎭
 <rule>                          ⎫
  <element>                      │
   <name>a</name>                │
   <type>extension</type>        ⎬274
   <value>mp3</value>            │
  </element>                     │
 </rule>                         ⎭
</filter>
```

FIG.11A

```
 ┌─280
│ LIST FILE
│ <?xml version="1.0" encoding="shift_jis"?>
│ <summary>
│   <application>MediaPlayer</application>
│   <data>
│     <element>object</element>
│     <type>scheme</type>                          ─282
│     <value>rtsp://www.XXXX.co.jp/test.svg</value>
│   </data>         283
│   <data>
│     <element>a</element>
│     <type>extension</type>                       ─284
│     <value>http://www.XXXX.co.jp/test1.mp3</value>
│   </data>         285
│   <data>
│     <element>a</element>
│     <type>extension</type>                       ─286
│     <value>http://www.XXXX.co.jp/test2.mp3</value>
│   </data>         287
│ </summary>
```

FIG.11B

```
 ┌─290
│ rtsp://www.XXXX.co.jp/test.svg     ─283
│ http://www.XXXX.co.jp/test1.mp3    ─285
│ http://www.XXXX.co.jp/test2.mp3    ─287
```

DOCUMENT PROCESSING DEVICE AND PROGRAM

TECHNICAL FIELD

The present invention relates to a technique which receives and gives information in switching of application programs in a multi-task environment in which a plurality of application programs can be executed.

BACKGROUND ART

In recent years, portable information apparatuses or information appliances which have a communication function and can be connected to a network such as the Internet are widely popularized. In many information terminals typified by the apparatuses and the appliances, a plurality of application programs commencing with a browser are incorporated, so that a huge variety of complex functions are provided to users.

Information may be desired to be exchanged between a plurality of application programs executed by an information terminal. For example, by using a character string in a document browsed by a browser, a mail may be transmitted, or a phone call may be made. In order to solve this problem in a conventional technique, a hyperlink is popularly set to a telephone number or an e-mail address in web contents. This hyperlink may be defined in advance in a HyperText Markup Language (HTML) file or data transmitted by a Common Gateway Interface (CGI) from a server. Even though the hyperlink is not defined in advance, a browser may automatically set a hyperlink by searching a text. For example, when a text includes a telephone number 090-1234-5678, the browser detects the telephone number to set a hyperlink such as <a href="tel:090-1234-5678">090-1234-5678</a>. When the hyperlink displayed on a screen of the browser is clicked, an installed Telephone software program is activated, and a telephone call program window in which the telephone number is input is opened. When the text includes a mail address xxx@foo.bar, the browser detects the mail address, a hyperlink such as <a href="mailto:xxx@foo.bar">xxx@foo.bar</a> is set to the mail address. When the hyperlink displayed on the screen of the browser is clicked, the installed e-mail program is activated, and a mail creating window on which the mail address is displayed as a destination is opened. In this manner, data designated by an anchor href can be given from the browser to another application.

In addition to the above technique, as a technique which gives information between applications, the following technique is known. Patent Document 1 discloses a technique which analyzes an HTML document browsed by a browser to extract information such as an address or a telephone number and embeds an object button which activates an application corresponding to an extracted character string in the HTML document. Patent Document 2 discloses a technique which extracts information such as a telephone number or a mail address by analyzing an HTML document and, when a cursor is pointed to the extracted information, automatically displays a menu which activates an application corresponding to the information. In any one of the techniques, when the application is activated, the extracted information is output to the application.

[Patent Document 1] Japanese Patent Application (Laid Open) No. 2003-122771

[Patent Document 2] Japanese Patent Application (Laid Open) No. 2000-330681

DISCLOSURE OF THE INVENTION

Problems to be Solved by the Invention

However, in the above conventional techniques, the type of data which can be used in a switched application program is limited to an address or a telephone number. Two or more data cannot be given from an original application program to a switched application program at once.

In an information terminal such as a mobile phone having low operability because of a small display, key operations must be repeated many times when a plurality of data are switched between application programs, and the operation tends to be cumbersome. For this reason, a technique is highly desired which easily and smoothly exchanges data between the application programs.

The present invention has been made in consideration of the above problem and a general purpose thereof is to provide a document processing technique which makes it easy to exchange data between application programs.

Means to Solve the Problems

An embodiment of the present invention is a document processing apparatus. This apparatus operates in a multi-task environment in which a plurality of application programs can be executed, includes: a switching detecting unit which detects switching from a screen displayed by a first application program to a screen displayed by a second application; a character string extracting unit which detects a character string from a document file displayed on the screen by the first application program by using a filter serving as a rule to detect a character string which can be used in the second application program; and a display control unit which causes a display unit to perform a display operation in a display mode in which a user selects an item actually used in the second application from items associated with the character string detected by the character string extracting unit in response to detection of the switching by the switching detecting unit.

The "document file" is not limited to a file which performs a main process in an application program, and may be data including a text which can serve as an extraction source of a character of a character string. As an example, the "document file" includes a file serving as a source of a text displayed on the screen by the application program, a text file such as a play list displayed on a screen in a media player, a data file serving as a source of a table displayed on a screen in a scheduler or the like.

The "switching of screens" includes both a case in which screen displays are switched between a plurality of application programs in operation and a case in which screen displays are switched because a new application program is activated. Even though the first application program is directly executed after the screens are switched, or immediately after an extracting process of a character string is completed, the first application program may be ended.

The "first application program" and the "second application program" correspond to an "original application" and a "switched application" as an example in the embodiment, respectively.

It is intended herein that the "items associated with a character string" includes a character string itself detected from a document file, a file which can be accessed by using the character string, and an arbitrary name or image which causes a user to recognize a file or an object which can be accessed by using the character string. As an example, when a character string detected from the document file is a mail address, the items include an address of a mail address which is a character string detected from the document file. When the character string is the link, the items include a title of a page or an object or a thumbnail of a page or an object which a link represents.

According to the embodiment, character strings supposed to be used in the second application program is automatically detected from a document file on display in the first application program, and items associated with the character strings are displayed in a mode which can be selected by a user. Therefore, data cooperation between the application programs becomes easy. Furthermore, since a character string associated with an item can be input by only selecting the item from a list, data input can be rapidly performed.

The document processing apparatus may further include a filter storing unit which stores a plurality of filters associated with application programs, respectively, and a filter selecting unit which selects a filter associated with the second application program from the filter storing unit. In this case, the character string extracting unit may detect a character string by using the filter selected by the filter selecting unit.

According to this, since a character string is extracted from a document by using the filter corresponding to the second application, the character string to be detected can be changed depending on applications, and the type of the character string to be detected is not limited. Since all character strings according to the filter are detected, the number of character strings given from an original application to a switched application is not limited.

The association between the application program and the filter includes all the case in which a character string to be detected by the filter depends on a frequency of appearance of a character string in the application program, the case in which a character string to be detected by the filter depends on a unique item of the application program, the case in which a character string to be detected by the filter depends on an item which characterizes the application program, and the case in which metadata of a file opened by the application program, for example, a character string to be detected by the file depends on a file size or a format of the file.

The display control unit may display items associated with a character string detected by the character string extracting unit in a list together with a display screen of the second application program and outputs the character string corresponding to one item or a plurality of items selected from the list by a user to the second application program such that the character string is input to a certain region of the second application program. When the items associated with a plurality of detected character strings are displayed in the form of a list, an item can be easily selected even on a portable information apparatus having a limited display area, and usability can be prevented from being deteriorated.

The character string extracting unit may collect character strings detected from a document file displayed in the first application program to create a list file in which the character strings are described in a predetermined description format which can set element names for the character strings. The list file is described in the above format to increase the degree of freedom obtained when the list file is used in the second application program. For example, with reference to a tag of a character string detected in the list file, a switched application can determine a type of the character string.

The document processing apparatus may include a filter storing unit which stores an object filter which detects a character string representing a position of an external object file, a link filter which detects a character string expressed in a link format to the outside, or a tag filter which detects a character string sandwiched by predetermined tags which set an item name from a document file. In this manner, the filter can be set such that a desired character string is detected depending on a type of the second application.

The document processing apparatus may further include a user setting unit which presents a filter held by the filter storing unit as a candidate for selection to a user to cause the user to select a filter used in the character string extracting unit in preference to a correspondence relationship between an application program and a filter determined by the filter storing unit. Since types of data supposed to be used in a switched application change depending on users, data matched with the preference of a user can be given to the switched application by the above method.

The filter selecting unit may receive a designation of a filter to be used by the character string extracting unit from the second application program and select a designated filter from the filter storing unit in preference to a correspondence relationship between the application program and the filter determined by the filter storing unit. Alternatively, the filter selecting unit may select different filters from the filter storing unit depending on types of character strings detected in accordance with a predetermined rule from a document file which is being displayed in the first application program. In this manner, regardless of the correspondence relationship between the application program and the filter determined by the filter storing unit, a filter is selected in accordance with a request from the second application program or contents of the file in execution in the first application program, so that a character string of an appropriate type can be detected from the document file.

Still another embodiment of the present invention is also a document processing apparatus. This apparatus operates in a multi-task environment in which a plurality of application programs can be executed, and includes: a switching detecting unit which detects switching from a screen displayed by a first application program to a screen displayed by a second application program; a character string extracting unit which detects a character string from a document file displayed on a screen by the first application program by using a filter serving as a rule to detect a character string which may be used in the second application program from a document file; and an output unit which creates and outputs a list file in which items associated with a character string detected by the switching detecting unit in response to detection of switching by the switching detecting unit.

According to this embodiment, a character string supposed to be used in the second application program is automatically detected from a document file on display in the first application program, a list file including an item associated with the character string is output to the second application program. The second application program can perform an arbitrary process by using the received list file.

Still another embodiment of the present invention is a browser program which causes a computer to execute functions corresponding to the above constituent elements. The functions corresponding to the above constituent elements may be provided as a part of the first application program.

An arbitrary combination of the above constituent elements, a thing that the expression of the present invention is transformed between a method, an apparatus, a system, a recording medium, a computer program, and the like is effective as an embodiment of the present invention.

Advantages of the Invention

According to the present invention, data described in a document file on display in a certain application program can be easily given to another application program.

BRIEF DESCRIPTION OF THE DRAWINGS

FIG. 9A is a diagram showing an example of an XML document displayed by a browser which is an original application, and FIG. 9B is a diagram showing an example of a screen actually displayed on a display by a browser in accordance with the XML document;

FIG. 10 is a diagram showing an example of a filter;

FIG. 11A is a diagram showing an example of a list file created in accordance with a filter 270, and FIG. 11B is a diagram showing an example of a list displayed in accordance with the list file;

Figure 1:
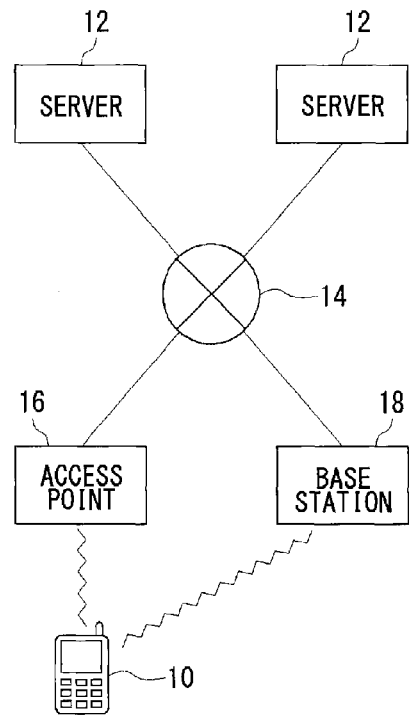
FIG. 1 is a diagram showing an entire configuration of a network system including a portable information apparatus including a document processing function according to the embodiment.

DESCRIPTION OF REFERENCE NUMERALS 10 portable information apparatus, 100 document processing unit, 102 data acquiring unit, 104 character string extracting unit, 106 display control unit, 108 output unit, 110 switching information acquiring unit, 120 filter setting unit, 122 filter selecting unit, 124 filter storing unit, 126 user setting unit, 150 original application, 152 application switching managing unit, 160 switched application, 170 kernel.

BEST MODE FOR CARRYING OUT THE INVENTION

An embodiment of the present invention is a document processing apparatus which, in a multi-task environment in which a plurality of application programs can be executed, when application programs are to be switched, by using a filter depending on a type of a switched application, detects a character string from a file on display in an original application program and displays the detected character string in a mode which can be selected by a user together with an execution screen of a second application program.

A portable information apparatus will be generally explained below. Subsequently, a document processing function according to the embodiment will be described below in detail.

FIG. 1 shows an entire configuration of a network system including a portable information apparatus 10 having the document processing function according to the embodiment.

The portable information apparatus 10 is arbitrary hardware such as a laptop Personal Computer (PC) having a communication function, a Personal Digital Assistance (PDA), a mobile phone, or a car navigation system which can be moved with a user. The portable information apparatus 10 is connected to a network 14 such as a LAN or the Internet through an access point 16 or a base station 18, or the like by an operation of a user and accesses a server 12 specified by a Uniform Resource Locator (URL) to make it possible to obtain desired data.

The server 12 provides data such as text data, image data, audio data, or moving image data to the portable information apparatus 10 through the network 14. The server may be a web server or a service subject on the Internet. In this case, the server can be realized in various modes, for example, a mode in which a main function of processes is left on a server side as in a Common Gateway Interface (CGI), a mode in which a main function of processes moves to a client side as in a Java (registered trademark) applet, a mode in which Java applications or the like serving as a main function of processes are arranged for both a server and a client, and the like.

Even though the portable information apparatus 10 does not access the network 14, a file stored in an internal storage device or a storage medium is designed to be able to be referred and edited by a user operation.

Figure 2:
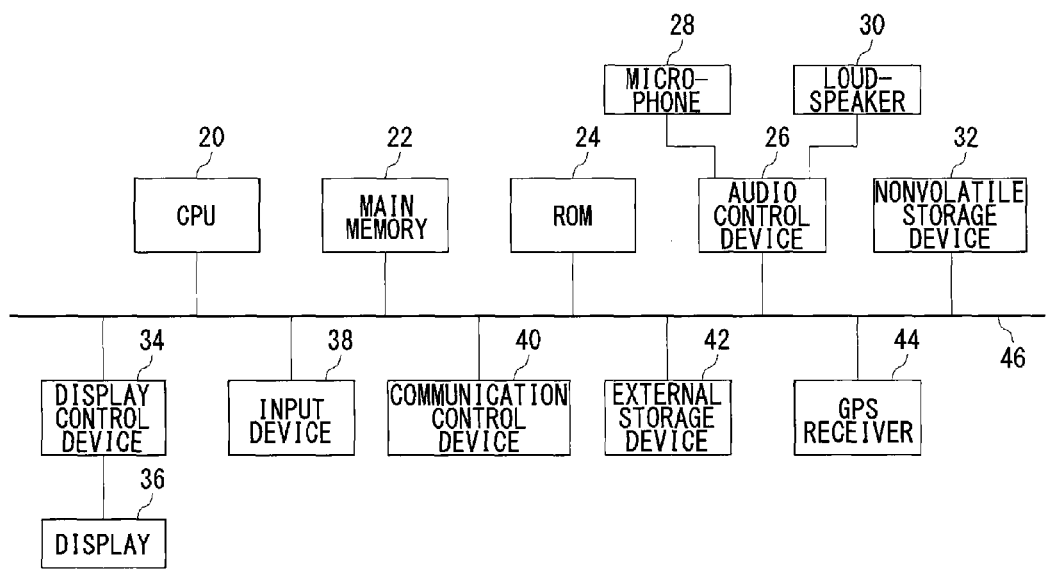
FIG. 2 is a hardware block diagram of a portable information apparatus.

FIG. 2 is a hardware block diagram of the portable information apparatus 10. The portable information apparatus 10 includes a Central Processing Unit (CPU) 20, a main memory (RAM: Random Access Memory) 22, a Read Only Memory (ROM) 24, an audio control device 26, a nonvolatile storage device 32, a display control device 34, an input device 38, a communication control device 40, an external storage device 42, and a GPS receiver 44. These devices are connected to each other through a bus 46.

The CPU 20 entirely controls the portable information apparatus 10 by operating an operating system. The CPU 20 reads a program or data from the ROM 24 or a recording medium mounted on the external storage device 42 to the main memory 22. According to this, various processes are executed. The main memory 22 serves as a temporary memory area and a work area required when the CPU 20 executes a program and an area in which various data required to execute the program are stored. The ROM 24 is a read-only storage device in which a computer program and data executed by the CPU 20 are stored.

The audio control device 26 is arranged in a portable information apparatus with a telephone function commencing with a mobile phone and connected to a microphone 28 and a loudspeaker 30 to perform audio input/output control.

The nonvolatile storage device 32 is a storage device which can hold storage contents even after the power supply is turned off, and includes a hard disk drive or a semiconductor memory such as a flash memory.

The display control device 34 generates a video signal to display data written in a frame buffer (not shown) by the CPU on a display 36 arranged in the portable information apparatus 10.

The input device 38 is a device used to cause a user to input a designation of an operation to the portable information apparatus 10. The input device 38 includes arbitrary devices depending on an apparatus such as a pointing device such as a key or a track pad, various buttons, and a touch panel arranged on a surface of the display 36. In the portable information apparatus 10, an operation such as a copy-and-paste operation or a drag operation cannot be easily performed because the portable information apparatus 10 does not generally have a mouse. However, a mouse may be connected to the portable information apparatus through a Universal Serial Bus (USB) terminal or the like.

The communication control device 40 controls audio and data communications by communication schemes. A data communication scheme includes an arbitrary scheme such as a wireless Local Area Network (LAN) system such as IEEE802.1b/g, infrared communication, and data communication performed by packet communication. By using a cable, the portable information apparatus 10 may be connected to the network 14.

The external storage device 42 is a drive device using an exchangeable recording medium. The recording medium includes a magnetic disk, an optical disk, a magneto optical disk, a semiconductor memory, or the like.

The GPS receiver 44 is a device which measures a position of a portable information apparatus based on a radio wave from an artificial satellite.

Since the constituent elements described above are known, further detailed descriptions of the constituent elements will not be repeated.

The outline of functions of a document processing unit 100 according to the embodiment and the relationship between the functions and an application program executed by the portable information apparatus 10 will be described below.

Figure 3:
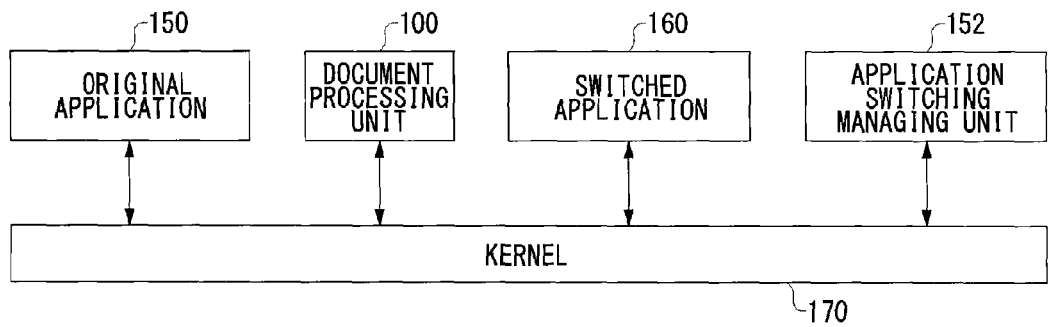
FIG. 3 is a block diagram for explaining a relationship between an application program and a document processing unit in the portable information apparatus.

FIG. 3 is a block diagram for explaining a relationship between an application program and a document processing unit in the portable information apparatus 10. A kernel 170 of an operating system can simultaneously execute a plurality of application programs and supports a preemptive multi-task. It is supposed that a plurality of application programs are executed on the kernel 170. In execution of a certain application program, when a user presses down an application switching button (not shown) included in the portable information apparatus 10 to designate application programs to be switched, an application switching managing unit is activated. When the user selects any one of application candidates displayed by the application switching managing unit, the application program is newly activated, or the screen is switched to a screen displayed by the application program. In the following description, an application program originally displayed on the display of the portable information apparatus 10 is called an "original application" 150, and an application program to be switched by a user is called a "switched application" 160.

In FIG. 3, the document processing unit 100 and an application switching managing unit 152 are preferably provided as functions of the operating system.

When the displayed screen is switched from the original application 150 to the switched application 160, the document processing unit 100 receives a document file displayed by the original application 150, for example, an HTML file through the kernel 170 and extracts a predetermined character string by applying a filter (will be described below) to create a list by the extracted character string. The document processing unit 100 displays any one of the character strings in the created list together with the screen of the switched application 160 in a mode in which a user can select the character string.

Figure 4:
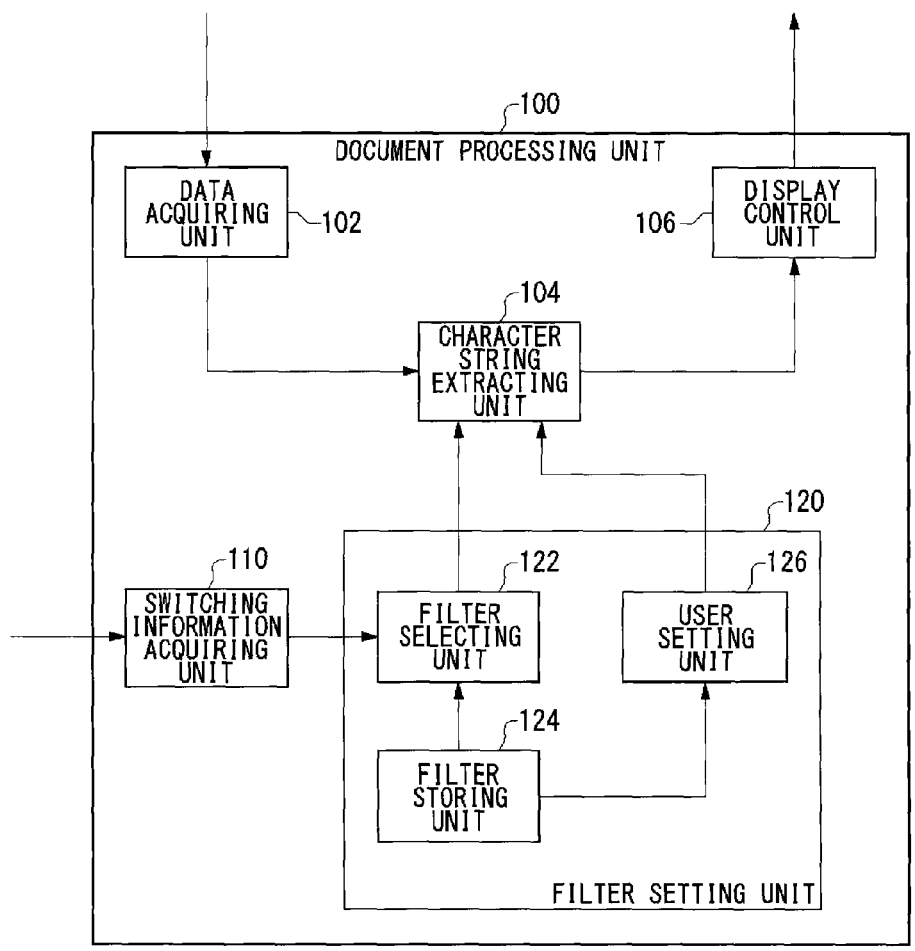
FIG. 4 is a diagram showing a configuration of a document processing unit.

FIG. 4 shows a configuration of the document processing unit 100. This configuration is realized by a CPU, a memory, and another LSI in an arbitrary computer in hardware, or realized by a program or the like loaded on the memory in software. In FIG. 4, functional blocks realized by cooperating the hardware and the software. Therefore, it is conceived by a person skilled in the art that these functional blocks can be realized in various forms by only the hardware, only the software, or a combination of the hardware and the software.

Operations and configurations of the functional blocks will be described below in detail.

A data acquiring unit 102 receives a document file which is currently displayed in the original application 150 through the kernel 170. The document file mentioned here is preferably described in a markup language such as the Standard Generalized Markup Language (SGML), the HyperText Markup Language (HTML), the extensible Markup Language (XML), or the like. A text file or data file is also preferable. The document file may include a script language such as EcmaScript.

A character string extracting unit 104 uses a filter selected by a filter selecting unit 122 to detect a character string from the document file received from the data acquiring unit 102. In this case, the "filter" is a rule to detect a character string which is a character string supposed to be used in the switched application 160 and which is matched with a predetermined condition from the document file.

Furthermore, the character string extracting unit 104 collects character strings detected from the document file and creates a list file in which the character strings according to a predetermined description format (for example, the HTML or the XML) which can set element names to the character strings. The created list file is given to a display control unit 106. Alternatively, the character string extracting unit 104 may sequentially send the detected character strings one by one to the display control unit 106 without creating the list file.

It can be said that the character string extracting unit 104 functions as a summarizing unit which creates a summary of the document file in the sense that some character strings are extracted from the document file opened in the original application 150.

A switching information acquiring unit 110 acquires information representing that a screen displayed by the original application 150 is switched to a screen displayed by the switched application 160. This information is sent from the application switching managing unit 152 through the kernel 170. Switching of the applications occurs when a user operates an application switching button arranged on the portable information apparatus 10, or when an application which uses data set by an anchor is activated in clicking a hyperlink displayed by the original application.

The display control unit 106 presents to a user a character string that can be actually used in the switched application 160 in response to switching detection in the switching information acquiring unit 110 in a display mode in which the user can select the character string among character strings detected by the character string extracting unit 104.

As an example, the display control unit 106, by using a list file received from the character string extracting unit 104, displays in a list the character strings detected by the character string extracting unit 104 together with a screen displayed by the switched application 160. When any one of the character strings from the list is selected by the user, the display control unit 106 outputs one selected character string or a plurality of selected character strings to the switched application 160. The switched application performs a process of displaying the output character string in a predetermined region.

A filter setting unit 120 holds a filter to detect a character string included in a document file displayed by the original application 150 and selects an appropriate filter. The filter setting unit 120 includes the filter selecting unit 122, a filter storing unit 124, and a user setting unit 126.

The filter storing unit 124 stores a plurality of filters associated with application programs, respectively. The application programs are, for example, a browser, a mailer, a data holder, a media player, and the like. The details of the filter will be described later.

The filter selecting unit 122 selects an appropriate filter from the filters held in the filter storing unit 124. The filter selecting unit 122 determines a type of the switched application 160 and preferably selects a filter associated with the type of the switched application 160. However, a filter corresponding to the type of the original application 150 may be selected.

When a user performs a predetermined operation in the portable information apparatus 10, the user setting unit 126 presents the plurality of filters held in the filter storing unit 124 to a user as selection candidates. When the user selects any one of the filters depending on a scene, the user setting unit 126 designates the character string extracting unit 104 to use the selected filter in preference to a correspondence relationship, which is determined by the filter storing unit 124, between the application program and the filter. In this manner, a filter suitable for the preference of the user can be used. As a matter of course, a filter set by default can be continuously used. In this case, the user need not select a filter or perform a special operation about a character string to be detected in the filter. The selection of the filter by the user setting unit 126 may be set in advance before the application programs are switched, or may be set each time the switching of the application programs occurs.

Figure 5:
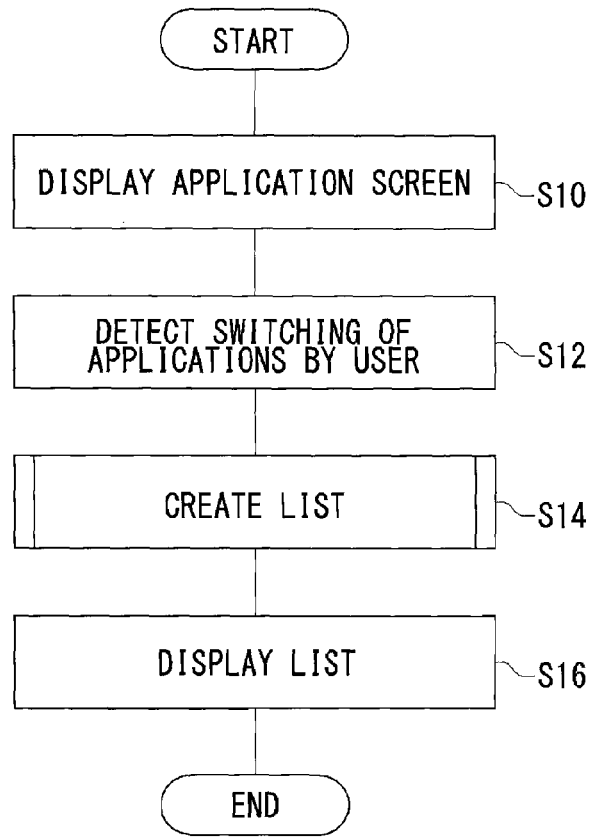
FIG. 5 is a flow chart showing an outline of a procedure which gives data from an original application to a switched application when application programs to be displayed on a screen are switched according to the embodiment.

FIG. 5 is a flow chart showing an outline of a procedure of giving data from the original application 150 to the switched application 160 when applications to be displayed on the screen are switched according to the embodiment.

When the original application 150 is displayed on the screen (S10), the switching information acquiring unit 110 acquires information representing that the application programs are switched by the user (S12). The data acquiring unit 102 acquires a document file opened in the original application 150 through the kernel 170 and detects a character string from the document file by using the filter selected by the filter selecting unit 122. A list file is created by the detected character string (S14) The display control unit 106 displays a list of character strings on the display 36 of the portable information apparatus 10 together with the display screen of the switched application 160 by using the list file (S16).

Figure 6:
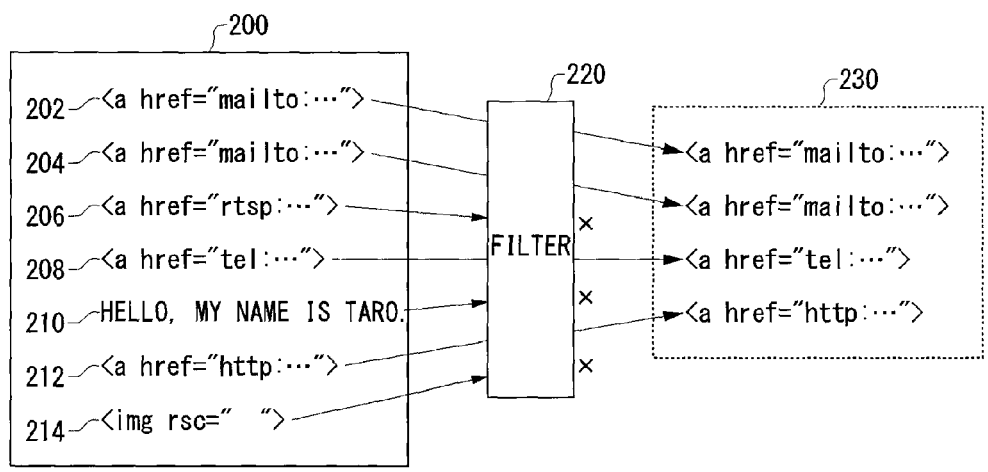
FIG. 6 is a block diagram showing an outline of a function of a filter in the embodiment.

FIG. 6 is a block diagram showing an outline of a function of a filter in the embodiment.

It is assumed that a document file such as an HTML document 200 is displayed by the original application 150. The HTML document 200 includes hyperlinks 202 to 208 and 212 which designate a URL that the link represents, a mail address, and a telephone number by an anchor, a text 210, and an embedded object 214. It will be considered that, in the HTML document 200, the character string extracting unit 104 detects a character string by using a certain filter 220. It is assumed that the filter 220 is to regulate a rule which detects a mail address, a link including a telephone number, and a URL in conformity to an HTTP protocol. In this case, as shown on the right side in FIG. 6, only the hyperlinks 202, 204, 208, and 212 are detected, and the other hyperlink 206, the text 210, and the embedded object 214 are not detected. More specifically, a link and a text which are not matched with the rule regulated by the filter are excluded by the filter 220. By using a set of character strings 230 which can pass through the filter 220, the character string extracting unit 104 creates a list file.

Figure 7:
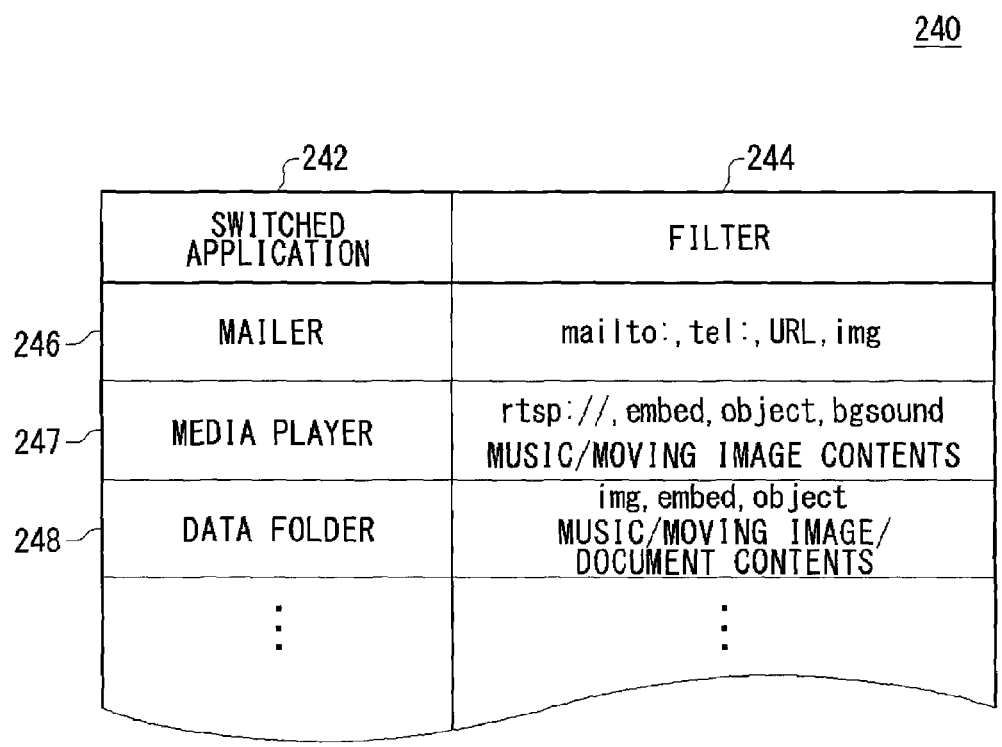
FIG. 7 is a table showing an example of a filter prepared in association with a switched application.

FIG. 7 is a table 240 showing an example of a filter held in the filter storing unit 124 and prepared in association with the switched application 160. A column 242 indicates a type of the switched application. A column 244 indicates an object to be detected by the character string extracting unit 104 depending on the type of applications.

For example, as shown in a row 246, when the switched application is a mailer, a filter is associated which detects a character string including "mailto: or tel:" in an anchor, a URL starting from "http://", an embedded object having "img" as an extension, and the like.

As shown in a row 247, when the switched application is a media player which reproduces music or a moving image, a filter is associated which detects music contents and moving image contents such as a URL starting from "rtsp://", a character string sandwiched by tags such as "embed", "object" and "bgsound", and the like.

As shown in a row 248, when the switched application is a data holder which holds various data, a filter is associated which detects music contents, moving image contents and document contents such as an embedded object having "img" as an extension, a character string sandwiched by tags such as "embed" and "object", and the like.

In this manner, in the filters held in the filter storing unit 124, a rule which detects a character string indicating a position of an external object file, a character string expressed in a link format to the outside, and a character string sandwiched by predetermined tags which set element names in a document file is regulated. A character string to be detected by the filter is not limited to the above character strings. An arbitrary character string supposed to be used in the switched application may be used. More specifically, a text indicating specific contents such as an address, a personal name, and a thing name may be used.

FIG. 7 shows a filter associated with a switched application. However, a filter associated with an original application can be regulated in the same manner as described above.

Figure 8:
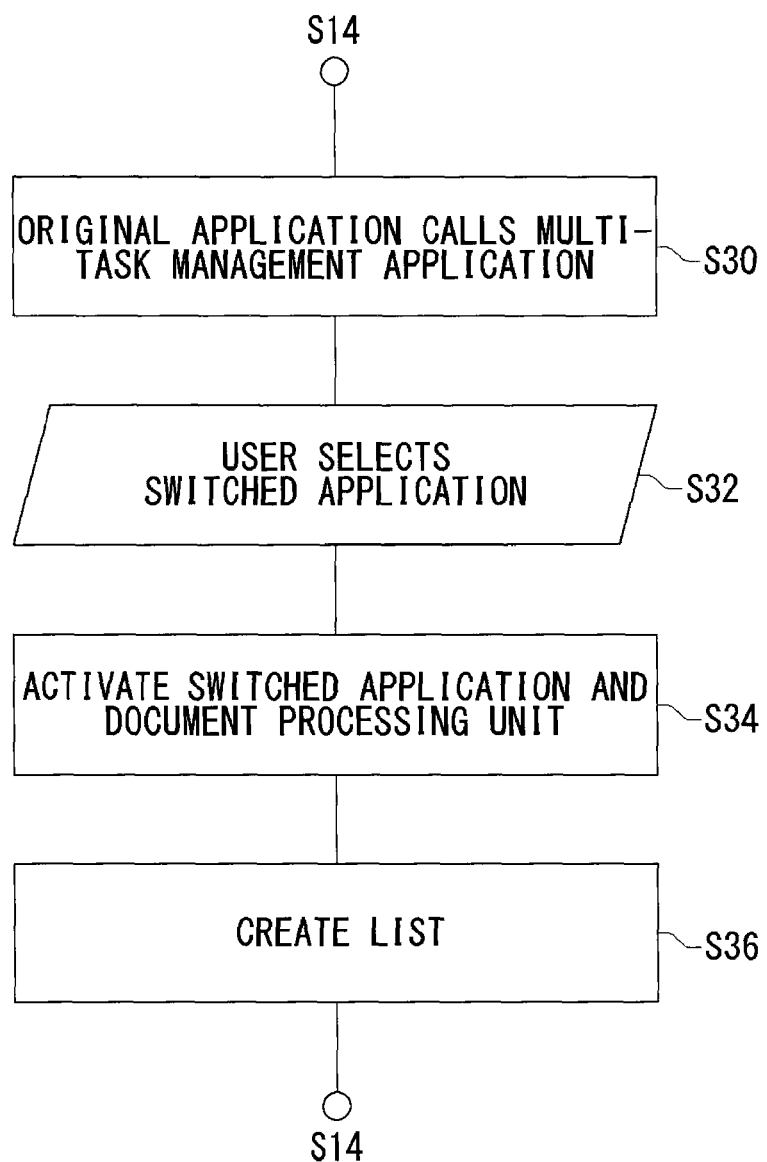
FIG. 8 is a detailed flow chart of list creation in step S14 in FIG. 5.

FIG. 8 is a detailed flow chart of list creation in step S14 in FIG. 5.

When a user designates switching display screens of application programs, the original application 150 calls the application switching managing unit 152 (S30). The application switching managing unit 152 presents candidates of application programs to be switched. The user selects the switched application 160 from the candidates (S32). Subsequently, the application switching managing unit 152 activates the selected switched application 160 and the document processing unit 100 (S34). The document processing unit 100, by using a filter depending on the type of the switched application 160, detects a character string from a document file which is being displayed by the original application 150 and creates a list file of the detected character strings (S36). In this manner, the process is performed through the application switching managing unit 152, so that the document processing unit 100 can acquire information about the original application 150 and the switched application 160.

After the switched application 160 is activated by the application switching managing unit 152, when the switched application 160 requests a list file, the application switching managing unit 152 may activate the document processing unit 100.

Subsequently, with reference to FIGS. 9 to 11, an example of a document file, a filter, and a list file in conformity to the XML format will be described below.

FIG. 9A shows one example of an XML document 250 displayed by a browser serving as an original application. As shown in FIG. 9A, the XML document 250 includes an object 252 and anchors 254 to 258 including URLs. FIG. 9B shows a screen 260 actually displayed on a display by a browser according to the XML document 250. On the screen 260, an object 262 is displayed and character strings 264 to 268 are clickably displayed corresponding to the object 252 and the anchors 254 to 258.

FIG. 10 is an example of a filter 270. In FIG. 10, a part sandwiched by <rule> tags indicates a block of rules. A rule 272 expresses that, the name of a rule, the type of the rule, and the object to be detected of the rule are "object", "scheme", and "rtsp://", respectively. A rule 274 expresses that the name of a rule, the type of a rule, and an object to be detected of the rule are "a", "extension" and an extension ".mp3", respectively. In this manner, to a filter, a plurality of character strings to be detected can be designated.

FIG. 11A is an example of a list file 280 created according to the filter 270. As shown in FIG. 11A, a part sandwiched by <data> tags indicates one detected character string. Tag <element> indicates the rule among the rules shown in FIG. 10 by which detection is performed. <scheme> expresses the type of the rule. <value> expresses a character string detected by the rule. In FIG. 11A, a character string 283 is detected as an object starting from "rtsp://", and character strings 285 and 287 are detected as URLs each having the extension ".mp3".

FIG. 11B is an example of a list 290 displayed according to the list file 280. When the list 290 is displayed on a screen, only detected character strings 283, 285, and 287 are displayed.

As shown in FIG. 11A, since a list file is described in XML format, the degree of freedom when the list file is used in a switched application will be increased. For example, since the list file includes a tag of the detected character string, the switched application can determine the type of the character string with reference to the tag. Therefore, when a user selects a certain characteristic string from the list, it is possible that a selected character string is input to an appropriate position depending on the type of the character string. More specifically, a browser receives a list file including tags such as a "name", an "address", and an "age". When an HTML document displayed by the browser includes a "form" tag, a process of inputting a character string including the selected name, the selected address or the selected age to a predetermined input space generated by a form tag can be performed.

Figure 12A:
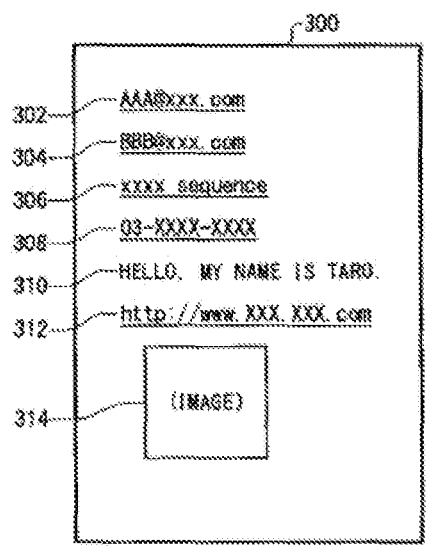
FIGS. 12A to 12C are diagrams showing screens displayed on a display of a portable information apparatus.
Figure 12B:
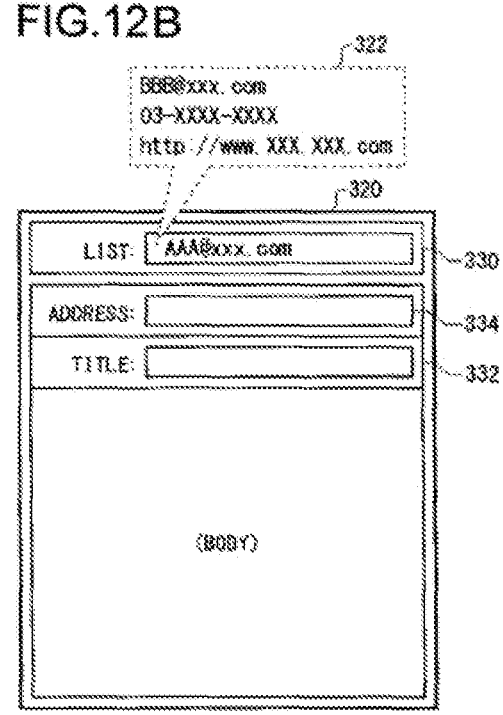
Figure 12C:
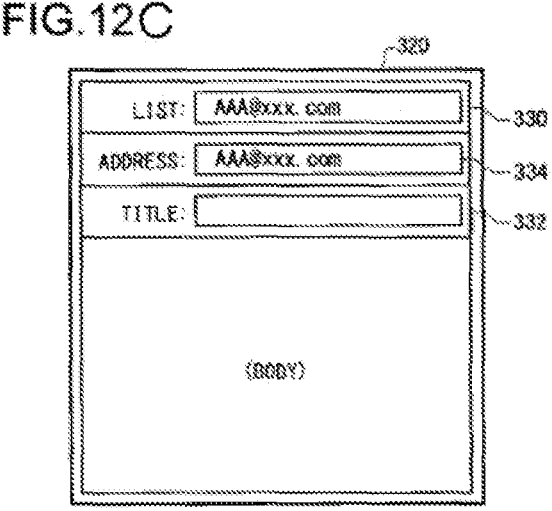

FIGS. 12A to 12C are screens displayed on the display 36 of the portable information apparatus 10. In the examples, the original application 150 is a browser, and the switched application 160 is a mailer.

FIG. 12A shows an example of a screen 300 displayed on the display 36 of the portable information apparatus 10 by the browser. On the screen 300, mail addresses 302 and 304, hyperlinks 306, 308, and 312, a text 310, and an embedded object 314 are displayed.

In this state, when applications are switched depending on an operation by a user, the filter selecting unit 122 selects a filter corresponding to a mailer serving as the switched application from the filter storing unit 124 and gives the filter to the character string extracting unit 104. The character string extracting unit 104 uses the filter to detect a character string from the document file displayed by the browser, and creates a list file.

FIG. 12B shows a screen 320 obtained after the applications are switched. The screen 320 includes a window 332 displayed by the mailer serving as the switched application and a window 330 displayed by the display control unit 106 by using the list file. On the window 330, one of the character strings extracted by the filter is displayed in a frame. When a user operates a predetermined key, character strings are sequentially displayed on the list display window 330 one by one from a list 322 surrounded by a dotted line in FIG. 12B.

When the user depresses a predetermined determination key while a desired character string is displayed, as shown in FIG. 12C, a character string displayed on the list display window 330 is input to the address region 334 of window 332. Any one of regions in the mailer window in which the character string is input may be selected by a user or may be selected by the mailer with reference to a tag described in the link file. When the same operations as described above are repeated, a plurality of character strings can be input to a desired region in the mailer window.

When a copy-and-paste operation is used in a conventional art, applications must be switched a number of times to repeat a copy operation more than once. In anchor click, a character string cannot be input to two or more destinations. However, according to the embodiment, a plurality of character strings detected by the filter can be easily input to the mailer, and the switching operation of the applications need not be repeated.

The portable information apparatus 10 may include a touch panel arranged to overlap a display. In this case, a desired characteristic string displayed on the list display window shown in FIG. 12B may be configured such that the character string is dragged and input to any one of regions of a destination, a title, and a text by using a finger, a stylus pen, and the like.

It is preferable that how to handle a character string in the list by the switched application depends on the switched application and is not regulated by the filter. This is because, the character string detected by the filter is displayed in only a mode in which the character string can be selected by a user to make it possible to give data regardless of use of the switched application.

In addition to the above examples, the following modes of use can be considered.

1. Original Application is Browser, and Switched Application is Media Player

When an HTML file displayed by a browser includes links to the objects of music contents or video contents, when the application is switched to a media player, the links to the objects are displayed in a list. When a user selects any one of the links, the link of the object is given to the media player. The media player accesses a destination that the link represents to download and reproduce the object. In this manner, a plurality of objects can be continuously reproduced.

2. Original Application is Data Folder, and Switched Application is Media Player A file name is detected from a display which lists files in a data folder, and the detected name can be input to a media player.

In addition, such a using method that a profile or the like detected from a scheduler is input to a predetermined format of a browser may be applied.

As described above, according to the embodiment, by using a filter selected depending on the switched application, character strings are detected from the original application, and the character strings are displayed in a list together with the switched application.

In a conventional art, although operationality in a single application used in a portable information apparatus is considered, operationality in cooperation between applications is rarely considered. In contrast to this, in the embodiment, a filter which is selected from a plurality of filters prepared in association with types of application programs in advance depending on a switched application program is used. Therefore, data cooperation between the application programs can be easily performed. Furthermore, since a character string can be input by only selecting the character string from the list, data is rapidly input.

In a portable information apparatus or an information appliance which does not have an input device such as a mouse having a high degree of freedom of operation, a copy-and-paste operation of a character string cumbersomely requires a plurality of key operations for selection and determination of a start point and selection and determination of an end point. However, in the embodiment, an operation other than switching of applications and selection of a character string from a list are not necessary, and a smooth and easy operation is realized. Therefore, the embodiment is especially effectively applied to a device such as a mobile phone.

In the embodiment, since a character string is extracted from a document by using a filter depending on a switched application, a character string to be detected can be changed depending on applications, and a type of a character string which can be extracted is not limited. Since all character strings depending on the filter are detected, the number of character strings given from the original application to the switched application is not limited to a specific number. Since a plurality of character strings are simultaneously presented in a list, a switching operation of screens between the original application and the switched application need not be performed more than once.

Since an area of a display is limited in a portable information apparatus, screens of the plurality of applications cannot be simultaneously displayed without considerably deteriorating the operationality. However, in the embodiment, since only a window on which a list is displayed is displayed together with a display screen of the switched application, the visibility of the switched application can be suppressed from being deteriorated.

Since association or the like of data between a character string detected by using a filter and the switched application is not executed, a detected character string can be freely used in the switched application.

In the description of the embodiment, the display control unit 106 displays character strings detected by the character string extracting unit 104 in a list according to the list file received from the character string extracting unit 104. However, the display control unit 106 may not only display the character strings themselves as items in a list but also display alternative items corresponding to the character strings in a list in place of/together with the character strings.

In this case, the "alternative items associated with character strings" (hereinafter referred to as "alternative items") include aibitrary names or images which causes a user to recognize a file or an object which is accessed by using a characteristic string detected by the character string extracting unit 104. As examples in which items other than character strings are displayed in a list, the followings are conceived.

1. When a character string described in a list file detected from a document file by the character string extracting unit 104 is a mail address, the display control unit 106 acquires an address corresponding to the mail address with reference to an address book of the mailer installed in the portable information apparatus 10 and displays the address as one item of the list.

2. When a character string detected from the document file by the character string extracting unit 104 and described in a list file is a link, the display control unit 106 acquires a title given to a page or an object that the link represents with reference to a server or an object the link represents, and displays the title as one item of the list. The "link" mentioned here indicates access information to a URL of an object such as another document or image embedded in the document file, and includes a hyperlink which causes the page to jump to a page that the link represents by a sleek click operation by a user. More specifically, when the page that the link represents is a web page, a title described by a <title> tag is acquired and displayed as one item of the list. When the page that the link represents is a music file or a video file, a song title or a video name recorded as metadata is acquired and displayed as one item of the list.

3. When a character string detected from the document file by the character string extracting unit 104 and described in a list file is a link such as a hyperlink, the display control unit 106 acquires a thumbnail of a page or an object that the link represents and displays the thumbnail as one item of the list.

As described above, in place of display of character strings detected from the document file in a list, an address, a title, a song title, a thumbnail, and the like are displayed in a list, so that an item is selected from the list to make it possible for a user to easily discriminate contents of information input to a switched application.

When an image is displayed as an item in a list, the display control unit 106 may display a URL having the image as a page that the link represents together with the image.

As described above, when an alternative item such as a name or an image corresponding to a character string without directly displaying the character string as an item, and when a user selects an alternative item from a list in the switched application, for example, a character string corresponding to the alternative item is input to an input region designated by the user. At this time, not only the character string but also the alternative item may be input.

Second Embodiment

In the first embodiment, the display control unit displays a list file created by the character string extracting unit 104 together with a display screen of a switched application. However, the list file may be displayed by the switched application.

Figure 13:
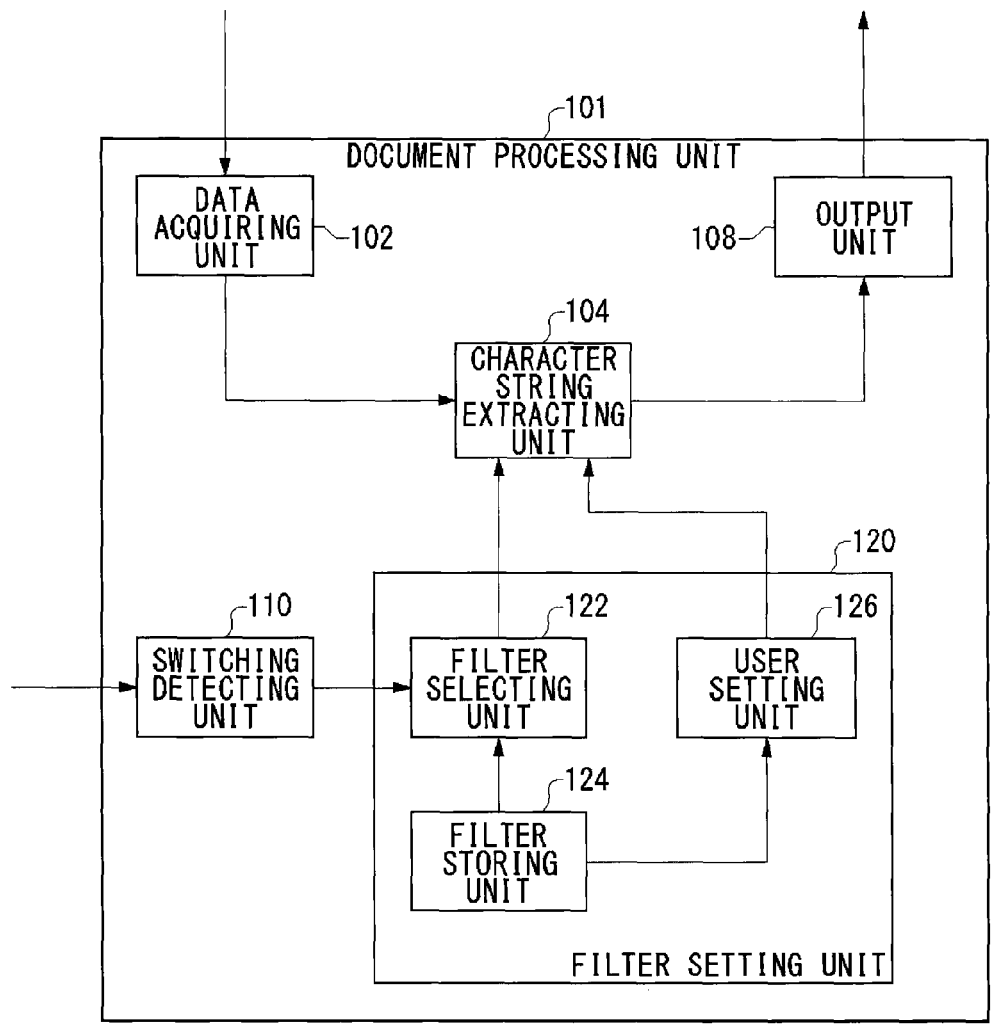
FIG. 13 is a functional block diagram of a document processing unit according to a second embodiment.

FIG. 13 is a functional block diagram of a document processing unit 101 according to a second embodiment. In FIG. 13, an output unit 108 is arranged in place of the display control unit 106.

The output unit 108 creates a list file in which character strings detected by the character string extracting unit 104 are listed in response to detection of switching by the switching information acquiring unit 110 and outputs the list file to a second application. The switched application displays a list of the character strings by using the received list file.

Alternatively, the output unit 108 may output only a character string selected from the list by a user to the switched application.

The document processing unit 101 may be provided as an independent application program or may be provided as a part of an operating system. The document processing unit 101 may be provided as a part of the functions of an original application. In this case, a user selects the switched application, when the document processing unit 101 extracts a character string by using a filter corresponding to the switched application to create a list. Thereafter, the original application can call a function which calls a switched application and give the created list as an argument of the function. Alternatively, after the original application calls the switched application, the list file may be given.

An object acquiring unit (not shown) which, when any one of the character strings displayed in the list is selected by a user and is a link of, for example, an object, accesses the object, acquires the corresponding object, and outputs the object to the switched application may be included in the document processing unit 101.

The switched application does not only directly display the character string according to the list file received from the output unit 108 but also display an item associated with the character string in a list.

The present invention has been described above with reference to the embodiments. The embodiments are illustrations. It is conceived by a person skilled in the art that various modifications of combinations between the constituent elements and the handling processes are effected and that the modifications are also included in the spirit and scope of the invention.

Modifications will be described below.

A filter created by a user herself/himself may be added. For example, an extension, a tag, an object name, and the like to be detected may be changed, a filter which regulates an application program associated with a new rule for detection may be created by the user. Types of character strings desired to be used in the switched application change depending on users. For this reason, in this manner, data matched with the preference of a user can be given to the switched application.

In the embodiments, a small window is arranged above a window of the switched application, and a list is displayed on the small window. However, a window of a list may be displayed to overlap a display window of the switched application, or the character string may ticker-display a character string at a predetermined portion of the window of the switched application.

When the original application is displayed, an input selecting mode included as an Front End Processor (FEP) in the portable information apparatus 10 is called. In this case, a character string detected from a document file displayed by the original application is given to the FEP as a list file, and the FEP may display a character string or an alternative item in a list. When the user selects any character string or an alternative item from the list, the FEP outputs the character string or the alternative item to the switched application. When a predetermined option menu is displayed and the original application is displayed, a list screen may be selected. On the list screen, character strings detected from the original application are listed. After any one of the character strings is selected from the list screen, a switched application is selected, and a paste operation in the display screen of the switched application is performed. In this case, a character string selected in advance may be pasted.

In FIG. 12B, when only a destination region in the window 332 is a place to which a character string is input, only a mail address is detected from a document file displayed by the original application and given to an FEP as a list file, and the FEP may be configured to display only the mail address in a list.

In the embodiments, although a browser is illustrated as an original application, the original application is not limited to the browser. An arbitrary application which can handle data of the HTML format or the XML format can be used.

The filter selecting unit 122 may receive a designation of a filter to be used by the character string extracting unit 104 from a switched application and select the designated filter from the filter storing unit 124 in preference to a correspondence relationship between the application and the filter determined by the filter storing unit 124. In this manner, for example, in accordance with the type of a file opened in, for example, the switched application, an appropriate character string can be detected from a document file of an original application.

The filter selecting unit 122 selects different filters from the filter storing unit 124 depending on types of character strings detected in accordance with a predetermined rule from a document filter which is being displayed in the first application program in preference to a correspondence relationship between the application program and the filter determined by the filter storing unit 124.

In the descriptions of the embodiments, a filter is prepared in association with the type of an application program. However, a correspondence relationship between an application program and a filter is not limited to the relationship described in the embodiments. The following relationships may be used.

1. According to a unique item of an application program or an item which characterizes an application program, a character string to be detected by a filter is regulated.

For example, when the switched application is a mailer, there is a unique item such as an address or a title. According to the item, a filter which extracts a character string such as mailto: or subject from a document file displayed on a screen by the original application may be associated with the application program.

2. A character string to be detected by a filter is regulated according to metadata of a file opened by an application program, for example, a file size or a file format.

In this case, since the filter is selected according to the file but the switched application, a filter matched with the contents of the file can be set. For example, files of a plurality of types can be opened in some application program. However, in this case, a filter is preferably set in accordance with the file.

A plurality of lists may be displayed to be classified by the types of character strings. The character string extracting unit refers to a tag or selectively uses filters to classify the character strings detected from a document file by types such as a URL, an object, and a mail address and to create list files classified by the type. The display control unit or the switched application, according to the list files classified by the type, displays independent lists such as a list of URLs, a list of images, and a list of mail addresses.

When a portable information apparatus has a plurality of displays, a list created by a document processing unit may be displayed on one screen, and a display screen of a switched application may be displayed on another screen.

The document process unit may have a filter updating unit which receives a new filter from a predetermined server to store the filter in the filter storing unit 124 or deletes an old filter. The new filter may be timely transmitted from a predetermined server to the portable information apparatus or downloaded by a user from a dedicated website.

Some functional blocks of the document processing unit may be present on a proxy server which acts for processes of a client terminal.

In the descriptions of the embodiments, the document processing apparatus according to the present invention is mounted on a portable information apparatus such as a mobile phone, a PDA, or a car navigation system. However, the document processing apparatus can be mounted on stationary hardware such as a desk-top PC or an information appliance including a communication function which is connected to a network such as the Internet, as a matter of course.

INDUSTRIAL APPLICABILITY

According to the present invention, data described in a document file displayed by a certain application program can be readily given to another application program.

What is claimed is:

1. A document processing apparatus having a processor coupled to a memory device, which operates in a multi-task environment in which a plurality of application programs can be executed, comprising:
- a display unit configured to display a first screen displayed by a first application program and a second screen displayed by a second application program;
- a switching detecting unit configured to detect switching from the first application program to the second application program;
- a character string extracting unit configured to generate, in response to detection of the switching by the switching detecting unit, a list including character strings extracted from a document file having a content displayed on the first screen by using a filter serving as a rule to detect one or more character strings which can be used in the second application program; and
- a display control unit configured to cause the display unit to display the list including the character strings on the second screen, and configured to receive a selection by a user of at least one of the character strings from the list for use by the second application program, and configured to cause the at least one of the character strings from the list to be input to a predetermined region of the second application program.

2. The document processing apparatus according to claim 1, further comprising:
- a filter storing unit configured to store a plurality of filters associated with application programs, respectively; and
- a filter selecting unit configured to select a filter associated with the second application program from the filter storing unit, wherein
- the character string extracting unit is configured to detect the one or more character strings using the filter selected by the filter selecting unit.

3. The document processing apparatus according to claim 2, wherein
- the character string extracting unit is configured to collect the one or more character strings detected from the document file having the content displayed on the first screen and to create a list file in which the one or more character strings are described in a predetermined description format configured to set element names for the one or more character strings.

4. The document processing apparatus according to claim 2, further comprising:
- a user setting unit configured to display one or more filters stored by the filter storing unit as a candidate for selection to the user to enable the user to select at least one of the one or more filters to be used in the character string extracting unit in preference to a relationship between an application program and a filter determined by the filter storing unit.

5. The document processing apparatus according to claim 2, wherein
- the filter selecting unit is configured to receive a designation of a filter to be used by the character string extracting unit from the second application program and select a designated filter from the filter storing unit in preference to a relationship between the application program and the filter determined by the filter storing unit.

6. The document processing apparatus according to claim 2, wherein the filter selecting unit is configured to select a second filter from the filter storing unit depending on a type of the one or more character strings to be detected in accordance with a predetermined rule from the document file having the content displayed on the first screen in preference to a relationship between the application program and the filter determined by the filter storing unit.

7. The document processing apparatus according to claim 1, further comprising:
- a filter storing unit configured to store a plurality of filters associated with application programs, respectively; and
- a filter selecting unit configured to select a filter associated with the first application program from the filter storing unit, wherein
- the character string extracting unit is configured to detect the one or more character strings using the filter selected by the filter selecting unit.

8. The document processing apparatus according to claim 7, wherein
- the character string extracting unit is configured to collect the one or more character strings detected from the document file having the content displayed on the first screen and to create a list file in which the one or more character strings are described in a predetermined description format which can set element names for the character strings.

9. The document processing apparatus according to claim 7, further comprising:
- a user setting unit configure to display one or more filters stored by the filter storing unit as a candidate for selection to the user to enable the user to select at least one of the one or more filters to be used in the character string extracting unit in preference to a relationship between an application program and a filter determined by the filter storing unit.

10. The document processing apparatus according to claim 7, wherein
- the filter selecting unit is configured to receive a designation of a filter to be used by the character string extracting unit from the second application program and select a designated filter from the filter storing unit in preference to a relationship between the application program and the filter determined by the filter storing unit.

11. The document processing apparatus according to claim 7, wherein
- the filter selecting unit is configured to select a second filter from the filter storing unit depending on a type of the one or more character strings to be detected in accordance with a predetermined rule from the document file having the content displayed on the first screen in preference to a relationship between the application program and the filter determined by the filter storing unit.

12. The document processing apparatus according to claim 1, wherein
- the display control unit is configured to cause the display unit to display the one or more character strings detected by the character string extracting unit in the list together with the second screen displayed by the second application program and output the at least one of the character strings from the list to the second application program.

13. The document processing apparatus according to claim 1, further comprising:
- a filter storing unit configured to store an object filter which detects a character string representing a position of an external object file from the document file, wherein
- the list includes an item associated with the one or more character strings detected by the character string extracting unit by using the object filter.

14. The document processing apparatus according to claim 1, further comprising a filter storing unit configured to store a link filter which detects a character string expressed in a link format to the outside from the document file, wherein the list includes an item associated with the one or more character strings detected by the character string extracting unit by using the link filter.

15. The document processing apparatus according to claim 1, further comprising:

a filter storing unit configured to store a tag filter which detects a character string sandwiched by predetermined tags which set an item name as a filter from the document file, wherein the list includes an item associated with the one or more character strings detected by the character string extracting unit by using the tag filter.

16. A document processing apparatus having a processor coupled to a memory device, which operates in a multi-task environment in which a plurality of application programs can be executed, comprising:

a display unit configured to display a first screen displayed by a first application program and a second screen displayed by a second application program;

a switching detecting unit configured to detect switching from the first application program to the second application program;

a character string extracting unit configured to generate, in response to detection of the switching by the switching detecting unit, a list including character strings extracted from a document file having a content displayed on the first screen by using a filter serving as a rule to detect one or more character strings which may be used in the second application program;

an output unit configured to output a list file which includes the list; and a display control unit configured to cause the display unit to display the list including the character strings on the second screen, and configured to receive a selection by a user of an item of at least one of the character strings from the list for use by the second application program, and configured to cause the at least one of the character strings from the list to be input to a predetermined region of the second application program.

17. A document processing program stored on a non-transitory computer-readable medium which operates in a multi-task environment in which a plurality of application programs can be executed, causing a computer to execute:

a first display function which causes a display unit to display a first screen of a first application program and a second screen of a second application program;

a switching detecting function which detects switching from the first application program to the second application program;

a character string extracting function which generates, in response to detection of the switching by the switching detecting function, a list including character strings extracted from a document file having a content displayed on the first screen by using a filter serving as a rule to detect one or more character strings which may be used in the second application program; and a second display function which causes the display unit to display the list including the character strings on the second screen, and receives a selection by a user of at least one of the character strings from the list for use by the second application program, and causes the at least one of the character strings from the list to be input to a predetermined region of the second application program.

18. The document processing program according to claim 17, wherein the document processing program is provided as a part of functions of the first application program.

19. A document processing program stored on a non-transitory computer-readable medium which operates in a multi-task environment in which a plurality of application programs can be executed, causing a computer to execute:

a first display function which causes a display unit to display a first screen of a first application program and a second screen of a second application program;

a switching detecting function which detects switching from the first application program to the second application program;

a character string extracting function which generates, in response to detection of the switching by the switching detecting function, a list including character strings extracted from a document file having a content displayed on the first screen by using a filter serving as a rule to detect one or more character strings which may be used in the second application program;

an output function which creates and outputs a list file which includes the list; and a second display function which causes the display unit to display the list including the one or more character strings on the second screen, and receives a selection by a user of at least one of the character strings from the list for use by the second application program, and causes the at least one of the character strings from the list to be input to a predetermined region of the second application program.

20. The document processing program according to claim 19, wherein the document processing program is provided as a part of functions of the first application program.

\* \* \* \* \*